United States Patent
Nakajima et al.

(10) Patent No.: US 10,829,081 B2
(45) Date of Patent: Nov. 10, 2020

(54) AIRBAG DEVICE

(71) Applicants: Yutaka Nakajima, Yokohama (JP);
Ryota Ishigaki, Yokohama (JP);
Yoshiki Ito, Yokohama (JP)

(72) Inventors: Yutaka Nakajima, Yokohama (JP);
Ryota Ishigaki, Yokohama (JP);
Yoshiki Ito, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 53 days.

(21) Appl. No.: 16/338,153

(22) PCT Filed: Jun. 30, 2017

(86) PCT No.: PCT/JP2017/024189
§ 371 (c)(1),
(2) Date: Mar. 29, 2019

(87) PCT Pub. No.: WO2018/061373
PCT Pub. Date: Apr. 5, 2018

(65) Prior Publication Data
US 2020/0023803 A1 Jan. 23, 2020

(30) Foreign Application Priority Data

Sep. 30, 2016 (JP) .................... 2016-194302

(51) Int. Cl.
*B60R 21/233* (2006.01)
*B60R 21/13* (2006.01)
(Continued)

(52) U.S. Cl.
CPC ............ *B60R 21/233* (2013.01); *B60R 21/13* (2013.01); *B60R 21/2035* (2013.01);
(Continued)

(58) Field of Classification Search
CPC ... B60R 21/13; B60R 21/2035; B60R 21/213; B60R 21/23138; B60R 21/232; B60R 21/239; B60R 2021/23332
See application file for complete search history.

(56) References Cited

U.S. PATENT DOCUMENTS

| 3,752,501 A | 8/1973 | Daniel et al. |
| 5,249,824 A | 10/1993 | Swann et al. |

(Continued)

FOREIGN PATENT DOCUMENTS

| JP | S48-050437 A | 7/1973 |
| JP | H05-213143 A | 8/1993 |

(Continued)

OTHER PUBLICATIONS

International Search Report (in English and Japanese) and Written Opinion (in Japanese) issued in PCT/JP2017/024189, dated Oct. 3, 2017; ISA/JP.

*Primary Examiner* — Faye M Fleming
(74) *Attorney, Agent, or Firm* — Stephen T. Olson; Harness, Dickey & Pierce, P.L.C.

(57) ABSTRACT

An airbag device that can efficiently suppress an injury value for an occupant in an emergency includes a frontal airbag cushion that is expanded at a vehicle front side of a driver's seat and a curtain airbag cushion that is expanded at an outer side of the frontal airbag cushion in a vehicle width direction. The frontal airbag cushion includes an inner bag that is expanded by receiving a gas, inner vents that are disposed in the inner bag to discharge the gas, an outer bag that contains the inner bag therein and is expanded by receiving the gas from the inner vents and outer vents that are disposed in the outer bag to discharge the gas. A distance between the inner bag and the curtain airbag cushion is smaller than a width of a head of an occupant.

6 Claims, 9 Drawing Sheets

(51) Int. Cl.
  *B60R 21/203* (2006.01)
  *B60R 21/213* (2011.01)
  *B60R 21/232* (2011.01)
  *B60R 21/239* (2006.01)
  *B60R 21/231* (2011.01)
  *B60R 21/00* (2006.01)

(52) U.S. Cl.
  CPC .......... *B60R 21/213* (2013.01); *B60R 21/232* (2013.01); *B60R 21/239* (2013.01); *B60R 21/23138* (2013.01); *B60R 2021/0009* (2013.01); *B60R 2021/0018* (2013.01); *B60R 2021/0048* (2013.01); *B60R 2021/23107* (2013.01)

(56) References Cited

U.S. PATENT DOCUMENTS

| | | | |
|---|---|---|---|
| 5,575,497 A * | 11/1996 | Suyama | B60R 21/231 |
| | | | 280/730.1 |
| 7,673,899 B2 | 3/2010 | Abe | |
| 8,439,395 B2 * | 5/2013 | Nagai | B60R 21/2346 |
| | | | 280/729 |
| 8,764,053 B1 | 7/2014 | Dix | |
| 8,899,617 B2 * | 12/2014 | Fukawatase | B60R 21/233 |
| | | | 280/730.2 |
| 8,967,660 B2 * | 3/2015 | Taguchi | B60R 21/232 |
| | | | 280/729 |
| 9,114,777 B2 * | 8/2015 | Fukawatase | B60R 21/233 |
| 9,701,272 B2 * | 7/2017 | Massa | B60R 21/213 |
| 9,744,936 B2 * | 8/2017 | Kruse | B60R 21/233 |
| 9,862,347 B2 * | 1/2018 | Deng | B60R 21/203 |
| 9,950,686 B2 * | 4/2018 | Hiraiwa | B60R 21/232 |
| 9,994,184 B2 * | 6/2018 | Deng | B60R 21/0136 |
| 10,023,148 B2 * | 7/2018 | Choi | B60R 21/16 |
| 10,065,593 B2 * | 9/2018 | Choi | B60R 21/2338 |
| 10,131,314 B2 * | 11/2018 | Yoo | B60R 21/233 |
| 10,358,107 B2 * | 7/2019 | Ohno | B60R 21/262 |
| 2006/0131846 A1 | 6/2006 | Abe | |
| 2014/0203541 A1 * | 7/2014 | Wei | B60R 21/233 |
| | | | 280/730.2 |
| 2014/0239619 A1 * | 8/2014 | Fukawatase | B60R 21/233 |
| | | | 280/730.2 |
| 2015/0307054 A1 * | 10/2015 | Fukawatase | B60R 21/23138 |
| | | | 280/729 |
| 2016/0200281 A1 * | 7/2016 | Takeshita | B62D 1/11 |
| | | | 280/730.2 |
| 2017/0072896 A1 * | 3/2017 | Fukawatase | B60R 21/232 |
| 2018/0326939 A1 * | 11/2018 | Jung | B60R 21/21 |
| 2019/0071047 A1 * | 3/2019 | Zhuang | B60R 21/2342 |
| 2019/0193668 A1 * | 6/2019 | Hayashi | B60R 21/231 |

FOREIGN PATENT DOCUMENTS

| | | |
|---|---|---|
| JP | 2006-199269 A | 8/2006 |
| JP | 2016-130043 A | 7/2016 |

* cited by examiner

A-A Cross Section

B-B Cross Section

C-C Cross Section

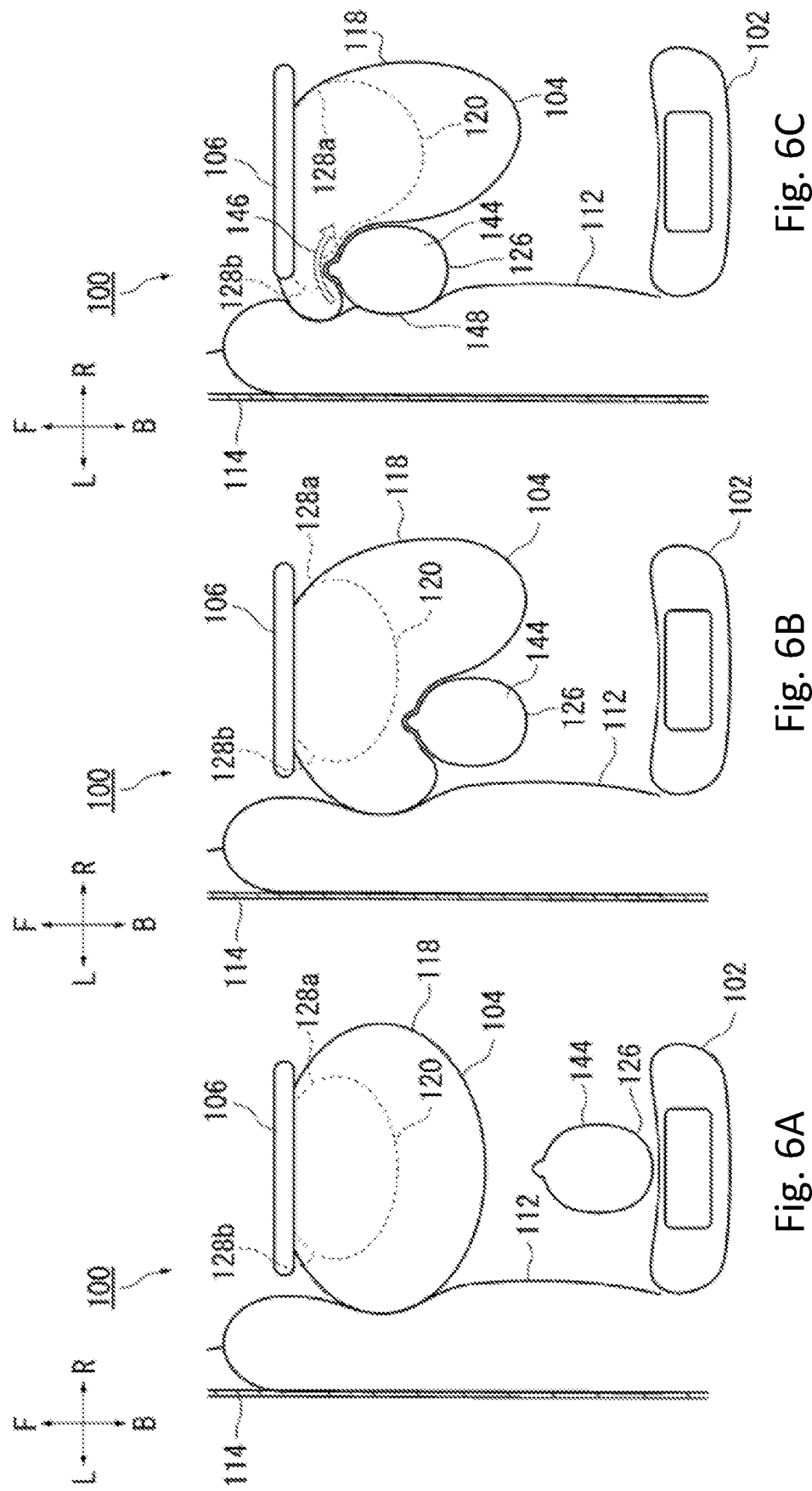

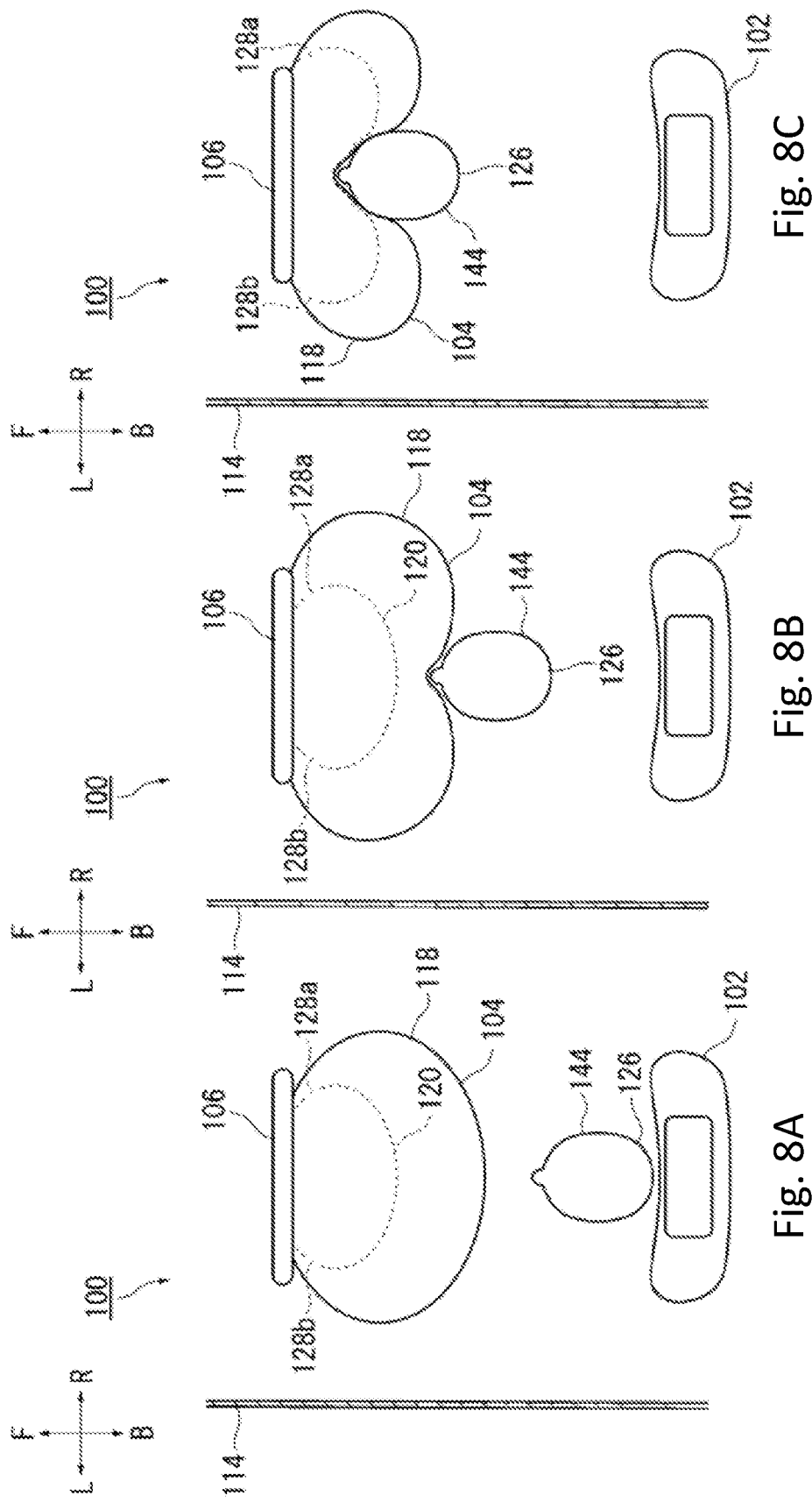

AIRBAG DEVICE

CROSS-REFERENCE TO RELATED APPLICATIONS

This application is a 371 U.S. National Stage of International Application No. PCT/JP2017/024189, filed Jun. 30, 2017, which claims the benefit of Japanese Patent Application No. 2016-194302, filed Sep. 30, 2016. The entire disclosures of the above applications are incorporated herein by reference.

TECHNICAL FIELD

The present invention relates to an airbag device that restrains an occupant in an emergency.

BACKGROUND ART

In the recent years, an airbag device has become standard equipment for most motor vehicles. The airbag device is a safety device that is activated in an emergency such as a vehicle collision and receives and protects an occupant by utilizing an airbag cushion that is expanded and deployed by a gas pressure.

There are various kinds of airbag devices according to installation locations and uses. For instance, in order to protect an occupant on a front seat mainly from an impact in a longitudinal direction (front-rear direction), a driver airbag is provided at a center of a steering wheel for a driver's seat (for instance, Patent Document 1). Further, in the vicinity of a passenger seat, a passenger airbag is provided at an instrument panel or its peripheral section. In addition, in order to protect each occupant at front and rear rows from a side collision and a subsequent roll-over (an overturn), a curtain airbag that is expanded and deployed along a side window near a ceiling of an wall portion is provided and a side airbag that is expanded and deployed directly adjacent to a side of an occupant is provided at a side of a vehicle seat.

PRIOR ART DOCUMENT

Patent Document

Patent Document 1: Japanese Patent Publication Number H05-213143.

SUMMARY OF THE INVENTION

At present, with respect to the airbag devices, it is required to take measures against an irregular collision and impact, for instance, such as a so-called oblique collision in which an impact in a diagonally longitudinal direction is applied to a vehicle. The occupant in the oblique collision enters an airbag cushion that is located at a front of the seat at an irregular angle in, for example, an oblique direction. In this case, when a head of the occupant contacts the airbag cushion at the front of the seat, a rotation of the head sometimes occurs because the moment, in which the neck works as an axis, is applied to the head. Because the rotation of the head explained above easily becomes a factor for enhancing an injury value for the occupant under the consideration of the structure of the human body, there is a desire for preventing such problems efficiently.

Problems to be Solved by the Invention

The present invention attempts to solve the above problems. An object of the present invention is to provide an airbag device that can efficiently suppress an injury value for an occupant in an emergency.

Means for Solving the Problems

In order to solve the above problems, as representative configurations of an airbag device according to the present invention, the airbag device that restrains an occupant sitting on a vehicle seat, the airbag includes a frontal airbag cushion that is expanded in a predetermined shape at a vehicle front side of the seat and a curtain airbag cushion that is expanded along a side window at an outer side of the frontal airbag cushion in a vehicle width direction. The frontal airbag cushion includes an inner bag that is expanded in a predetermined shape by receiving a gas, an inner vent that is disposed in the inner bag to discharge the gas, an outer bag that contains the inner bag therein and is expanded by receiving the gas from the inner vent, and an outer vent that is disposed in the outer bag to discharge the gas. A distance between the inner bag and the curtain airbag cushion is smaller than a width of a head of the occupant.

In an oblique collision and so on, there is a case in which an occupant on a driver's seat moves toward an oblique front with respect to a vehicle width direction. In particular, when the occupant moves toward the oblique front at an outer side with respect to the vehicle width direction, in the above configuration, the head of the occupant can be restrained from multiple directions by utilizing a frontal airbag cushion and a curtain airbag cushion. Specifically, the frontal airbag cushion restrains the head from the vehicle front side and the curtain airbag cushion restrains the head from the outer side in the vehicle width direction. As a result, the airbag device can suppress the rotation of the head so as to restrain the head while suppressing the injury value low.

In a conventional frontal airbag cushion, as compared with a curtain airbag cushion that is provided in anticipation of a roll-over and so on, a gas is discharged at an early stage and an internal pressure is quickly decreased. Accordingly, in the above configuration, the frontal airbag cushion has a double structure having an inner bag at an inner side and an outer bag at an outer side. In this double structure, the inner bag has a smaller capacity than the outer bag. Further, because the outer bag exists at an outside of the inner bag, the inner bag does not easily receive an external force when an occupant is restrained. As a result, the inner bag can keep a high internal pressure for a longer period of time. Therefore, as compared with a single structure, the frontal airbag cushion as a whole can keep the internal pressure for a long period of time. Thus, according to the above configuration, it becomes possible to perform an occupant restraint at the same time by synchronizing timing for maintaining the internal pressures of the frontal airbag cushion and the curtain airbag cushion that are expanded.

In addition, in the above configuration, the distance between the inner bag of the frontal airbag cushion and the curtain airbag cushion is set to be narrower than a width of the head of the occupant. The distance mentioned here means the closest distance between the points each other in which the inner bag and the curtain airbag cushion are adjacent the most. According to this configuration, it becomes possible to restrain the head by utilizing the internal pressure of the inner bag.

In the airbag device, it is preferred that the outer bag contacts the curtain airbag cushion when the outer bag is expanded. According to this configuration, it becomes possible to suitably restrain the head by the frontal airbag cushion and the curtain airbag cushion.

When the inner bag and the outer bag are expanded, a position of the inner vent and a position of the outer vent are different from each other in the vehicle width direction and in a vehicle vertical (up and down) direction. As a result, because the gas being discharged from the inner vent becomes difficult to be discharged to the outside, the internal pressure of the frontal airbag cushion can be kept for a long period of time.

The seat is a driver's seat and the frontal airbag cushion is provided at a center of a steering wheel. The inner bag and the outer bag are expanded in a circular and three-dimensional shape when viewed from the driver's sear. According to this configuration, it becomes possible to suitably protect the occupant on the driver's seat.

The inner vent is provided at a side of the steering wheel than a most expanded part of the inner bag in the vehicle width direction when the inner bag is expanded. The position at which this inner vent is provided is located near the outer bag within the inner bags at the time of the expansion and deployment and easily contacts the outer bag. According to this configuration, the inner vent is easily closed by the outer bag when the occupant is restrained and the discharge of the gas from the inner vent is suppressed. As a result, it becomes possible that the internal pressure of the inner bag is kept for a longer period of time.

The inner vent is provided at an inner side in the vehicle width direction with respect to the center of the steering wheel. According to this configuration, when the head of the occupant moves toward the oblique front at the outer side in the vehicle width direction, that is, when the head of the occupant moves obliquely toward the curtain airbag cushion side, the inner vent located at the inner side in the vehicle width direction is easily closed by the outer bag. Therefore, it becomes possible that the internal pressure of the inner bag is kept for a longer period of time and that the restraint of the head by the frontal airbag cushion and the curtain airbag cushion is efficiently achieved.

Effects of the Invention

According to the present invention, it is possible to provide an airbag device that can efficiently suppress an injury value for an occupant in an emergency.

BRIEF DESCRIPTION OF THE DRAWINGS

FIGS. 6A, 6B, and 6C are diagrams that exemplarily show a process in which the airbag device shown in FIG. 2 restrains an occupant in an oblique collision.

FIGS. 8A, 8B, and 8C are diagrams that exemplarily show a process in which the frontal airbag cushion shown in FIG. 2 restrains an occupant in a front collision.

EXPLANATION OF REFERENCE SIGNS

Figure 1A:
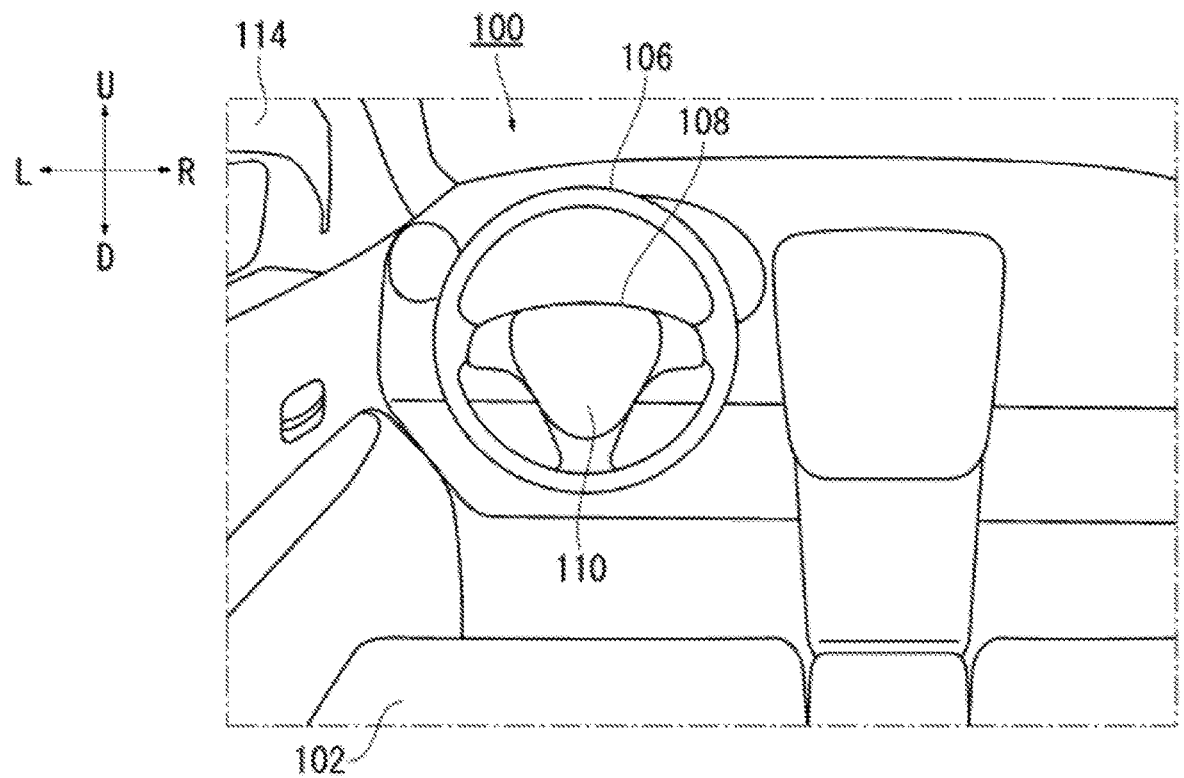
FIGS. 1A and 1B are diagrams that exemplarily show an overview of an airbag device according to an embodiment of the present invention.

D1—Distance between Inner Bag and Curtain Airbag Cushion, D2—Distance between Inner Bag and Curtain Airbag Cushion in Variation, H1—Height of Head of Hybrid3 Dummy, H2—Length of Head of Hybrid3 Dummy, H3—Width of Head of Hybrid3 Dummy, L1—Axis Direction of Steering Wheel Shaft, L2—Most Expanded Part of Inner Bag, L3—Center Line of Steering Wheel, T1—Height of Head of Thor Dummy, T2—Length of Head of Thor Dummy, T3—Width of Head of Thor Dummy, W1—Width of Head of Occupant, 100—Airbag Device, 102—Driver's Seat, 104—Frontal Airbag Cushion, 106—Steering Wheel, 108—Storage Part, 110—Cover, 112—Curtain Airbag Cushion, 114—Side Window, 116—Roof Side Rail, 118—Outer Bag, 120—Inner Bag, 122—Inflator in the disk type, 124—Stud Bolt, 126—Occupant, 128a—Inner Vent at the Right Side in the Vehicle Width Direction, 128b—Inner Vent at the Left Side in the Vehicle Width Direction, 128c—Inner Vent at the Vehicle Upper Side, 128d—Inner Vent at the Vehicle Lower Side, 132a—Outer Vent at the Upper Side, 132b—Outer Vent at the Lower Side, 134—Rear Row Seat, 136—Inflator in the Cylindrical Shape, 138—Tab, 140—Front Chamber, 142—Rear Chamber, 144—Head of Occupant, 146—Rotation, 148—Left Side of Head, 150—Steering Wheel Shaft, 152—Head of Thor Dummy, 154—Jaw tip of Thor Dummy, 156—Top of Head (Parietal Region) of Thor Dummy, 158—Fore Part of Thor Dummy, 160—Back of Head (Occipital Region) of Thor Dummy, 162—Head of Hybrid3 Dummy, 164—Jaw tip of Hybrid3 Dummy, 166—Parietal Region of Hybrid3 Dummy, 168—Nose of Hybrid3 Dummy, 170—Occipital Region of Hybrid3 Dummy, 178—Airbag Device in Variation, 180—Curtain Airbag Cushion in Variation, 182—First Chamber, 184—Second Chamber, 184—Third Chamber Mode for Carrying Out the Invention Preferred embodiments of the present invention will be explained in detail with reference to the attached drawings below. The dimensions, materials, other concrete numerical values, and others that are disclosed in the embodiments are merely examples for facilitating understanding of the invention. Thus, unless otherwise stated, they do not limit the scope of the present invention. Further, in the specification and the drawings, with respect to the elements having substantially the same functions and configurations, redundant explanations are omitted by accompanying the same reference numerals. Further, the elements that are not directly related to the present invention are not shown in the drawings.

FIG. 1 is a diagram that exemplarily shows an overview of an airbag device 100 according to an embodiment of the present invention. FIG. 1A is a diagram that exemplarily shows a vehicle prior to an operation of the airbag device 100. With respect to FIG. 1A and all other diagrams, a vehicle front and rear (longitudinal) directions respectively denote the arrows F (Forward) and B (Back), a left and right direction (crosswise direction) in a vehicle width direction respectively denote the arrows L (Left) and R (Right), and a vehicle up and down (vertical) directions respectively denote the arrows U (Up) and D (Down).

Figure 2:
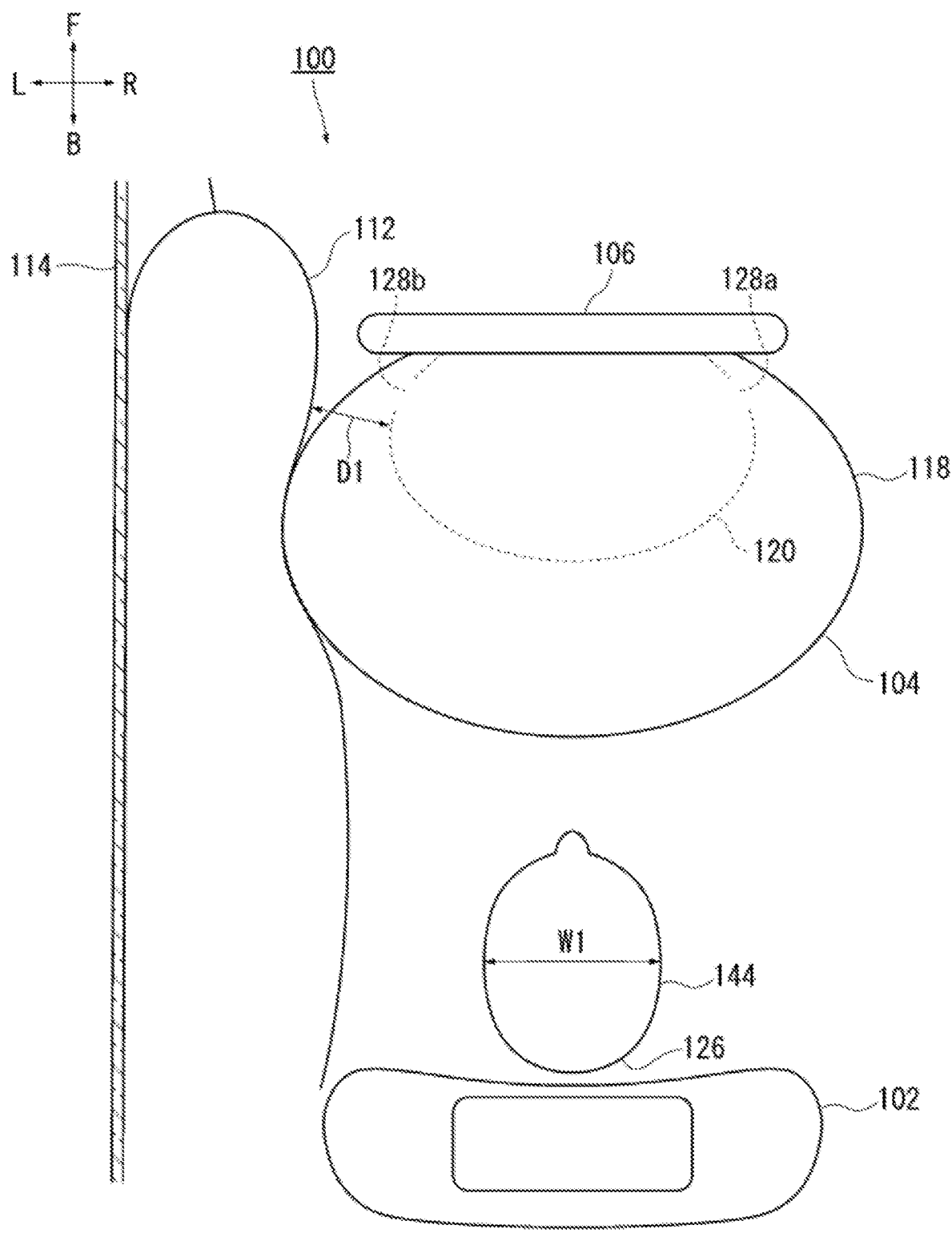
FIG. 2 is a diagram that exemplarily shows an overview of the airbag device shown in FIG. 1B viewed from a vehicle upper part.

In the present embodiment, the airbag device 100 is adopted so as to restrain an occupant 126 (refer to FIG. 2)

sitting on a driver's seat 102 (a seat at a left side in a front row) for a left-hand drive vehicle. Because the explanations below are given on the assumption of the driver's seat 102 that is located at the left side in the front row, for instance, a vehicle outer side in the vehicle width direction means the left side of a vehicle and a vehicle inner side in the vehicle width direction means the right side of the vehicle.

As parts that restrain the occupant 126 (refer to FIG. 2), the airbag device 100 is configured with a frontal airbag cushion 104 and a curtain airbag cushion 112 (refer to FIG. 1B) explained below. The frontal airbag cushion 104 is an airbag for the driver's seat that is provided at a center of a steering wheel 106. The frontal airbag cushion 104 is, for example, folded or wounded so as to be housed in a storage part 108 that is provided at the center of the steering wheel 106. The storage part 108 is configured by containing such as a cover 110 and a housing (not shown) underneath the cover 110.

Figure 1B:
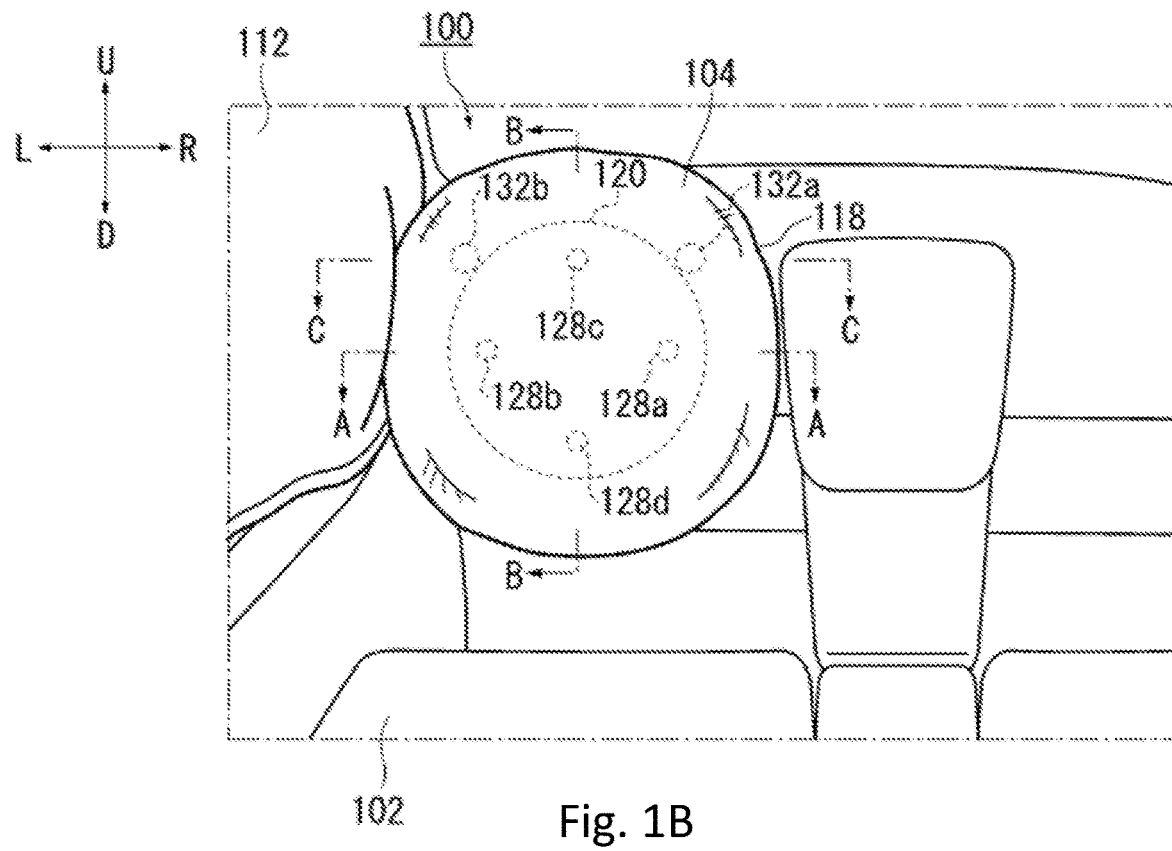

FIG. 1B is a diagram that exemplarily shows a state after the operation of the airbag device 100 shown in FIG. 1A. In FIG. 1B, not only an external form of the frontal airbag cushion 104 is shown but also an inner bag 120 and so on explained below being contained inside the frontal airbag cushion 104 is shown by a broken line.

Figure 3A:
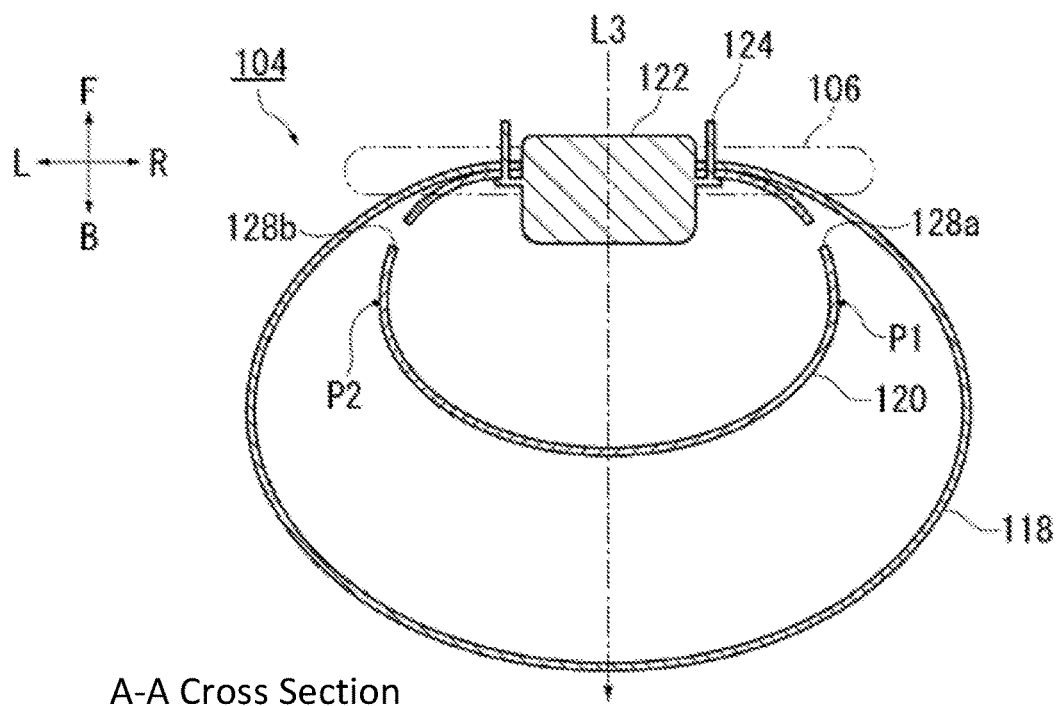
FIGS. 3A and 3B are cross-sectional views of a frontal airbag cushion shown in FIG. 1B.

When such as an impact occurs on the vehicle, various sensors (not shown) that are provided at the vehicle detect the impact, and due to this, a signal is transmitted to an inflator 122 (refer to FIG. 3A). Because a gas is supplied from the inflator 122 to the frontal airbag cushion 104 by receiving this signal, the frontal airbag cushion 104 cleaves the cover 110 (refer to FIG. 1A) and is expanded and deployed. At this time, the frontal airbag cushion 104 is expanded and deployed so as to be in a circular and three-dimensional shape at the vehicle front side of the driver's seat 102.

As described above, the airbag device 100 also has the curtain airbag cushion 112. When an offset collision and a side collision are detected by the various sensors, the curtain airbag cushion 112 is expanded and deployed downwardly along a side window 114 proximately from a roof side rail 116 (refer to FIG. 5) above the side window 114 (refer to FIG. 1A). Further, in the present application, a representation "up" denotes a vehicle ceiling direction when viewed from the place of interest and a representation "down" denotes a vehicle floor direction when viewed from the place of interest.

FIG. 2 is a diagram that exemplarily shows an overview of the airbag device 100 shown in FIG. 1B viewed from a vehicle upper part. The frontal airbag cushion 104 is provided with the configuration so as to be expanded in a circular and three-dimensional shape. Further, the curtain airbag cushion 112 is provided with the configuration so as to be widely expanded along the side window 114 at the vehicle outer side of the frontal airbag cushion 104. These frontal airbag cushion 104 and curtain airbag cushion 112 are formed in a bag shape by sewing or adhering overlapped two base cloths that compose the surfaces, or by the spinning and weaving by utilizing an OPW (One-Piece Woven).

The curtain airbag cushion 112 is expanded and deployed by contacting with an outer bag 118 of the frontal airbag cushion 104 at the vehicle outer side of the frontal airbag cushion 104. Here, in the present embodiment, the frontal airbag cushion 104 has a double structure having the outer bag 118 at the outer side and an inner bag 120 at the inner side. The configuration of the frontal airbag cushion 104 will be explained in detailed below.

FIG. 3 is each of cross-sectional views of the frontal airbag cushion 104 shown in FIG. 1B. FIG. 3A is a cross-sectional view along the A-A line being obtained by cutting in the vehicle width direction at the vicinity of the center of the frontal airbag cushion 104 shown in FIG. 1B in the vehicle vertical direction. First of all, a part of the inflator 122 that is a gas generator is inserted in the frontal airbag cushion 104. The inflator 122 is so-called the disk type in a discoid shape and is attached to the storage part 108 at the center of the steering wheel 106 by stud bolts 124. The frontal airbag cushion 102 is expanded by the pressure of the gas that is supplied from the inflator 122 and restrains the occupant 126 (refer to FIG. 2) on the driver's seat 102.

With respect to the inflators that have spread through the market at the present time, there are some types of the inflators in which a gas generating agent is filled therein and the gas is generated by combusting the gas generating agent, in which a compressed gas is filled therein and the gas is supplied without generating heat, and further, in which both the gas generating agent and the compressed gas are filled therein. As the inflator 122, any type can be utilized.

The inner bag 120 firstly receives the gas that is supplied from the inflator 122. The inner bag 120 is provided inside the outer bag 118 and is expanded to be in a circular and three-dimensional shape when viewed from the driver's seat 102 (refer to FIG. 2). Inner vents 128a-128d (refer to FIG. 1B) that discharge the gas are provided at predetermined positions at the inner bag 120.

As shown by broken lines in FIG. 1B, in the present embodiment, the inner vents 128a-128d are provided at a total of four positions in the vehicle width direction and in the vehicle vertical direction when viewed from the center of the inner bag 120. First of all, in the vehicle width direction, the inner vent 128a is provided at the right side (the vehicle inner side) and the inner vent 128b is provided at the left side (the vehicle outer side). In the vehicle vertical direction, the inner vent 128c is provided at a vehicle upper side and the inner vent 128d is provided at a vehicle lower side.

As exemplarily shown in FIG. 3A, the outer bag 118 is an outer portion that contains the inner bag 120 therein. The outer bag 118 is expanded by receiving the gas via the inner vents 128a-128d (refer to FIG. 1B). The outer bag 118 is also expanded to be in a circular and three-dimensional shape when viewed from the driver's seat 102 (refer to FIG. 2).

Figure 3B:
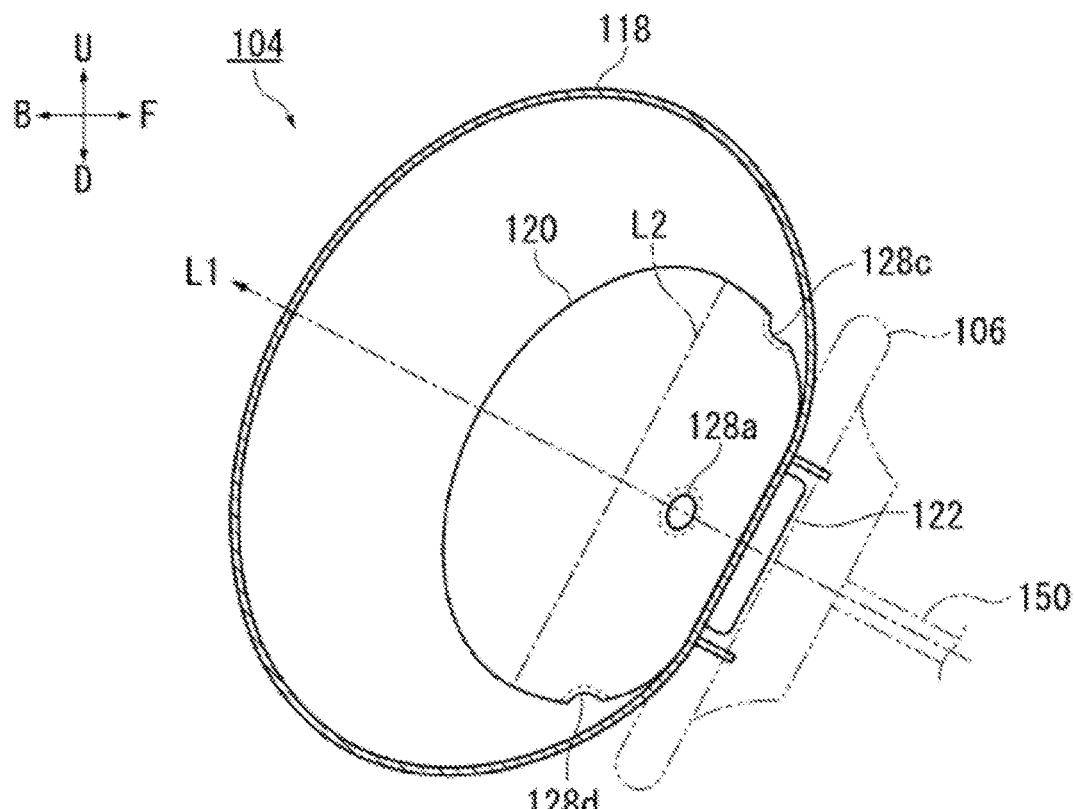

FIG. 3B is a cross-sectional view along the B-B line being obtained by cutting in the vehicle vertical direction at the vicinity of the center of the frontal airbag cushion 104 shown in FIG. 1B in the vehicle width direction. In FIG. 3B, only the outer bag 118 is cut and the inner bag 120 located at the inside thereof exemplarily shows an external appearance. The inner vent 128a is provided at the side of the steering wheel 106 within the outside surface of the inner bag 120 that is expanded to be in a slightly flat circular and three-dimensional shape. Similarly, this configuration is applied to the inner vents 128c and 128d, which are provided in the vehicle vertical direction, and is applied to the inner vent 128b shown in FIG. 3A.

Figure 4:
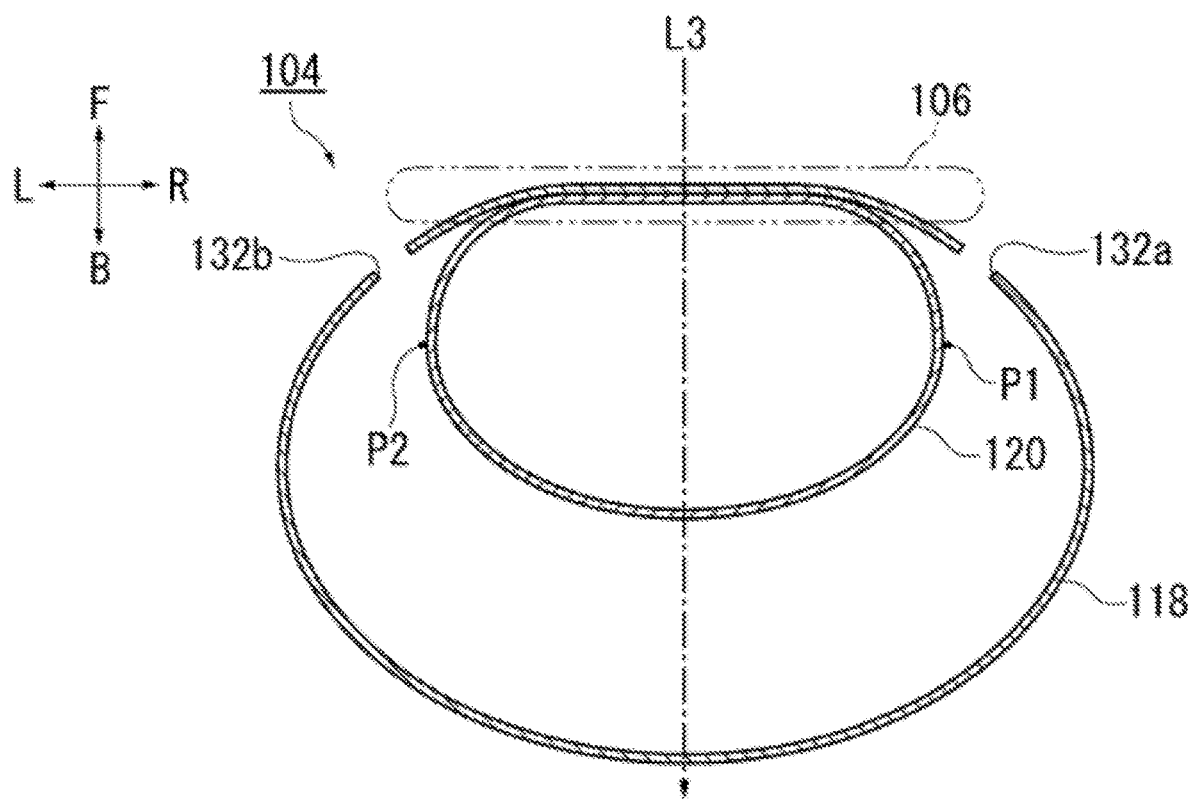
FIG. 4 is a cross-sectional view along the C-C line of the frontal airbag cushion shown in FIG. 1B.

FIG. 4 is a cross-sectional view along the C-C line of the frontal airbag cushion 104 shown in FIG. 1B. The C-C cross section is the C-C cross-sectional view that is obtained by cutting in the vehicle width direction at the slightly upper side than the center of the frontal airbag cushion 104 in FIG. 1B in the vehicle vertical direction. As shown in FIG. 1B, the outer bag 118 has outer vents 132a and 132b, which discharge the gas to the outside, at the slightly upper side in the vehicle vertical direction. The outer vents 132a and 132b are provided at the vehicle upper part than the inner vents 128a and 128b of the inner bag 120 and are located so as not to be overlapped with any of the inner vents 128a-128d when the outer bag 118 being in the circular shape is viewed from a position at the vehicle inner side directly opposite to the outer bag 118.

As exemplarily shown in FIG. 4, in the present embodiment, the outer vent 132a is provided at the right side (the vehicle inner side) in the vehicle width direction and the outer vent 132b is provided at the left side (the vehicle outer side) in the vehicle width direction. Because the gas is discharged from the outer vents 132a and 132b, the internal pressure of the frontal airbag cushion 104 is reduced so that its function is completed.

Figure 5:
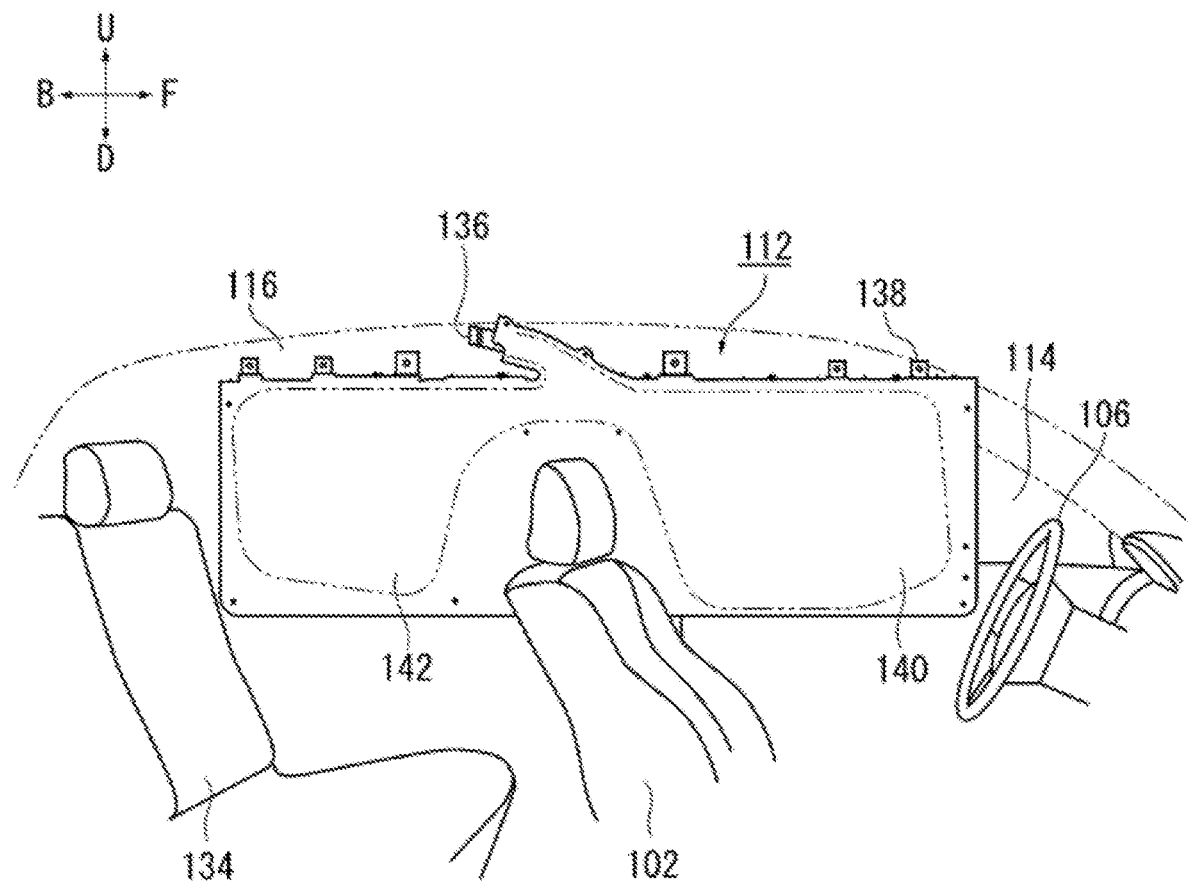
FIG. 5 is a diagram that exemplarily shows a curtain airbag cushion shown in FIG. 1B when viewed from a vehicle inner side.

FIG. 5 is a diagram that exemplarily shows the curtain airbag cushion 112 shown in FIG. 1B when viewed from a vehicle inner side. The configuration of the curtain airbag cushion 112 will be explained below.

The curtain airbag cushion 112 is widely expanded and deployed in the vehicle longitudinal direction at the vehicle outer side of the driver's seat 102 in the front row and a rear row seat 134. When the portion of the curtain airbag cushion 112 is largely classified, a front chamber 140 that restrains the occupant on the driver's seat 102 and a rear chamber 142 that restrains an occupant on the rear row seat 134 are provided.

The curtain airbag cushion 112 also has an inflator 136 at a predetermined position such as an upper part and is expanded and deployed by utilizing a gas that is supplied from the inflator 136. The inflator 136 that is in a cylindrical shape is adopted.

As a mounting portion of the curtain airbag cushion 112 to the vehicle, a plurality of band-shaped tabs 138 are provided at various places of an upper edge of the curtain airbag cushion 112. The tabs 138 are fixed to the roof side rail 116 via predetermined brackets and so on.

Prior to the operation, the curtain airbag cushion 112 is wound from the vehicle lower side so as to be a storage form in a longitudinal roll state in the vehicle longitudinal direction and is mounted in the roof side rail in the upward of such as the side window 114. The roof side rail 116 is commonly covered by a head lining (not shown) that is an interior material. The curtain airbag cushion 112 that is prior to the operation is housed in an inner space of the head lining and is invisible from the inside of the vehicle in which the occupant is present. Therefore, note that even when the explanation of "look at the curtain airbag cushion 112 from the inside of the vehicle" exists in the descriptions, the curtain airbag cushion 112 that is originally invisible from the inside of the vehicle is visualized by omitting the illustration of the head lining. Further, the storage form of the curtain airbag cushion 112 can be realized by being folded in the bellows shape from the vehicle lower side.

FIG. 6 is a diagram that exemplarily shows a process in which the airbag device 100 shown in FIG. 2 restrains an occupant in an oblique collision. In the oblique collision, the impact is applied to the vehicle in an oblique longitudinal direction. In FIG. 6, a case in which the collision occurs at the left front side of the vehicle is assumed. For the occupant 126 on the driver's seat 102 that is the left seat in the front row, the left side (the vehicle outer side) in the vehicle width direction is the side being close to the collision, i.e., a so-called near side. On the contrary, for the driver's seat, the right side (the vehicle inner side) in the vehicle width direction is the side being far from the collision, i.e., a so-called far side. When the impact at the near side is detected via the various sensors and a predetermined electronic control unit (ECU: Electronic Control Unit), the vehicle makes the curtain airbag cushion 112 in addition to the frontal airbag cushion 104 be expanded and deployed.

FIG. 6B exemplarily shows a state in which the occupant 126 moves further toward the left front side as compared to FIG. 6A. When the oblique collision occurs at the left side of the vehicle, the occupant 126 moves toward the left oblique front by the inertia so as to enter into a position at the left side of the vehicle than the center of the outer bag 118. In this time, in the present embodiment, the outer bag 118 contacts the curtain airbag cushion 112. As a result, even when the occupant 126 (in particular, a head 144) contacts the deviated position at the left side of the vehicle of the outer bag 118, the outer bag 118 can suitably restrain the occupant because the outer bag 118 can obtain the reaction force from the curtain airbag cushion as a support thereof.

FIG. 6C exemplarily shows a state in which the occupant 126 yet further moves toward the left front side as compared to FIG. 6B. In the present embodiment, with respect to the head 144 of the occupant 126 that moves toward the left front side, its front side is restrained by the frontal airbag cushion 104 and its side head part at the left side in the vehicle width direction is restrained by the curtain airbag cushion 112.

For instance, if the frontal airbag cushion that simply has only a single-bag structure in the bag shape, not the double structure, exists, when the head 144 that moves toward the left front side contacts the frontal airbag cushion, there may be a case in which a clockwise rotation force (a rotation 146 shown in the arrow) occurs in the head 144 with respect to a neck as an axis when viewed from above. When the above-mentioned rotation 146 occurs in the head 144, the injury value tends to be enhanced. Accordingly, in the present embodiment, the vicinity of a left side head 148 is also received by utilizing the curtain airbag cushion 112 so as to suppress the rotation 146 of the head 144. As a result, because the airbag device 100 can align the movement of the head 144 of the occupant 126 with the movement of such as a shoulder, the airbag device 100 restraints by significantly reducing or negating any rotation in which the head 144 is turned toward right and left directions (crosswise direction) with respect to such as the shoulder and in which the head 144 is inclined toward up and down and right and left. Thus, because the airbag device 100 restrains the head 144 from different directions by both the frontal airbag cushion 104 and the curtain airbag cushion 112, the injury value for the occupant 126 is efficiently suppressed by reducing an angular velocity of the head 144.

The clockwise rotation 146 is given as an example of the rotation that occurs to the head 136 as discussed above. However, when the above-mentioned airbag device is applied to, for example, the right seat in the front row, an occupant 134 moves toward, for instance, a right oblique front in the vehicle width direction and there may be a case in which a counter-clockwise rotation occurs in the head 136 with respect to a neck as a rotation center when viewed from above. With respect to this counter-clockwise rotation, the angular velocity of the head 136 can be reduced by reducing or negating the rotation by using the frontal airbag cushion 104 and the curtain airbag cushion 112 that have the above-mentioned configurations. That is, the airbag device 100 according to the present embodiment exhibits the effects by performing in the same manner for any of the left seat or the right seat.

In this airbag device, the occupant restraint performance of the frontal airbag cushion 104 is controlled so as to exhibit at the same time as the occupant restraint performance of the curtain airbag cushion 112. In the conventional frontal airbag cushion, as compared to the curtain airbag cushion that is in anticipation of such as a roll-over, not only the movement of the inflator is performed at the early stage but also the discharge of the gas is performed at the early stage. Therefore, the internal pressure is quickly decreased. For instance, the internal pressure maintaining time of the conventional frontal airbag cushion for the driver is within around 0.1 seconds. As a result, there is a big difference as compared with the conventional curtain airbag cushion in which the internal pressure maintaining time is approximately six seconds.

As explained above, in the airbag device 100, the frontal airbag cushion 104 has the double structure having the inner bag 120 at the inner side and the out bag 118 at the outer side. With respect to this double structure, the inner bag 120 has a smaller capacity than the outer bag 118. Further, because of the existence of the outer bag 118 at the outside, the inner bag 120 does not easily receive the external force when the occupant is restrained. As a result, the inner bag 120 can maintain a high internal pressure for a longer period of time. Therefore, it is possible that the frontal airbag cushion 104 as a whole maintains the internal pressure for a long period of time as compared with the conventional single structure.

Please refer to FIG. 3B again. The conventional frontal airbag cushion restrains the occupant after the completion of the expansion and the deployment within around 0.1 seconds when the impact is detected and discharges the gas from the outer vent to the outside so that its function is completed. However, in the present embodiment, in order to prolong the internal pressure maintaining time of the frontal airbag cushion 104 that operates in synchronization with the curtain airbag cushion 112, the contrivance for suppressing the discharge of the gas from the outer vents 132a and 132b is provided.

In the present embodiment, as shown in FIG. 1B, when the inner bag 120 and the outer bag 118 are expanded, the positions of the inner vents 128a-128d and the outer vents 132 and 132b are mutually different in the vehicle width direction or in the vehicle vertical direction. That is, when the frontal airbag cushion 104 is viewed in an axis direction L1 of a steering shaft 150 that is connected to the steering wheel 106 shown in FIG. 3B, the inner vents 128a-128d are provided so as not to be overlapped with the outer vents 132a and 132b. As a result, it is prevented that the gas that is discharged from the inner vents 128a-128d is directly discharged to the outside from the outer vents 132a and 132b. In other words, by making the routes of the gas flows from the inner vents 128a-128d toward the outer vents 132a and 132b faraway, it becomes difficult that the gas is discharged to the outside from the outer vents 132a and 132b.

As shown in FIG. 3A, the inner vents 128a and 128b are provided at the side of the steering wheel 106 than the most expanded position (an end point P1 at the right side in the vehicle width direction and an end point P2 at the left side in the vehicle width direction) that extends in the vehicle width direction the most of the inner bag 120 when the inner bag 120 is expanded. Furthermore, in other words, as exemplarily shown in FIG. 3B, in the axis direction L1 of the steering shaft 150 that is connected to the steering wheel 106, when the most expanded position (a line segment L2 that passes through the end points P1 and P2 shown in FIG. 3B) that extends the most of the inner bag 120 being expanded so as to be in the circular and three-dimensional shape is a boundary, the inner vents 128a-128d are provided on the surface at the side of the steering wheel 106.

At the time of the expansion and the deployment, the positions, in which the inner vents 128a-128d are provided, are close to the outer bag 118 in distance within the inner bag 120 and easily contact the outer bag 118. Therefore, as exemplarily shown in FIG. 6C, for instance, because the inner vent 128a is easily closed by the outer bag 118 that is deformed when the occupant is restrained, it is possible that the discharge of the gas is suppressed.

As shown in FIG. 3A, the inner vent 128a is provided at the inner side in the vehicle width direction with respect to a center line L3 of the steering wheel 106. When the head 144 of the occupant 126 advances to the oblique front at the outer side in the vehicle width direction, i.e., obliquely advances to the side of the curtain airbag cushion 112, the inner vent 128a with this configuration is easily closed by utilizing the deformation of the outer bag 118. According to this configuration, the discharge of the gas from the inner vent 128a can be efficiently suppressed.

As described above, the inner vent 128a is easily closed by utilizing the deformation of the outer bag 118 when the occupant is restrained in the offset collision and it is possible that the discharge of the gas is suppressed. Therefore, the airbag device 100 can maintain the internal pressure of the inner bag 120 for a longer period of time. Thus, according to the airbag device 100, because the timings for maintaining the internal pressures of the frontal airbag cushion 104 and the curtain airbag cushion 112 are synchronized, the restraint of the head 144 by both cushions can be simultaneously efficiently achieved.

In particular, in the present embodiment, as the configuration, the outer bag 118 of the frontal airbag cushion 104 contacts the curtain airbag cushion 112. At this time, for instance, with respect to the conventional frontal airbag, because the internal pressure is quickly decreased as compared with the curtain airbag cushion 112, the conventional frontal airbag is beaten against a push when the curtain airbag cushion 112 contact thereto so that there is a possibility that its attitude inclines toward the vehicle inner side. Therefore, in the present embodiment, because the internal pressure of the frontal airbag cushion 104 is maintained for a longer period of time as explained above, it can be realized that the frontal airbag cushion 104 maintains the attitude so as not to be beaten against the push by the curtain airbag cushion 112 and to make the frontal airbag cushion 104 and the curtain airbag cushion 112 work without any problems while being contacted each other.

With respect to the frontal airbag cushion 104, because the internal pressure of the inner bag 120 is maintained for a long period of time at the central side as explained above, the attitude of the entirety of frontal airbag cushion 104 including the outer bag 18 at the outer side can be easily maintained. Therefore, even when the occupant 126 obliquely enters the deviated position in the oblique collision, the frontal airbag cushion 104 can generate the reaction force by maintaining the attitude as much as possible and can suitably restrain the occupant 126.

Please refer to FIG. 2 again. With respect to the airbag device 100, a distance D1 between the inner bag 120 and the curtain airbag cushion 112 is narrower than a width W1 of the head 144 of the occupant 126. The distance D1 mentioned here means the shortest distance between the points in which the inner bag 120 and the curtain airbag cushion 112 are adjacent the most each other. According to this configuration, as exemplarily shown in FIG. 6C, it is possible to restrain the head 144 by efficiently utilizing the inner bag 120 that has the high internal pressure and the curtain airbag cushion 112. It is possible to set a size of the head 144 of the occupant 126 with reference to a human body dummy that is utilized for a vehicle collision experiment as explained below.

FIG. 7 is a diagram that exemplarily shows each kind of human body dummies. Each of the human body dummies is made based on the NHTSA (National Highway Traffic Safety Administration) standard.

Figure 7A:
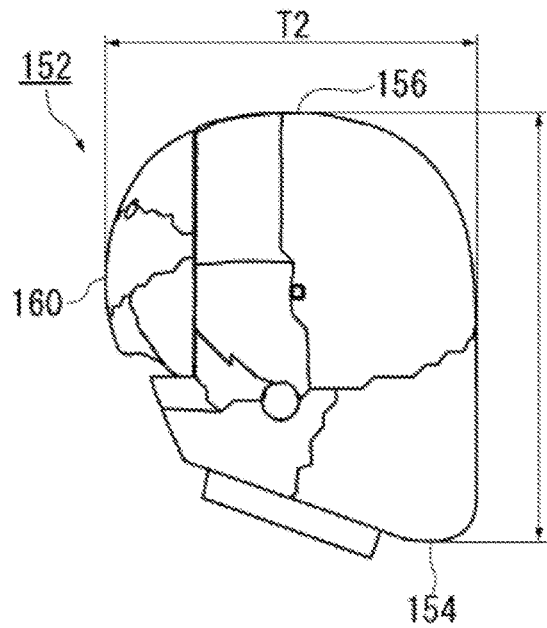
FIGS. 7A, 7B, 7C, and 7D are diagrams that exemplarily show various human body dummies.

FIG. 7A is a diagram that exemplarily shows a head 152 of the Thor dummy that is one kind of the human body dummies when viewed from the side. A height T1 from a jaw tip 154 to a top of a head (parietal region) 156 of the head 152 of the Thor dummy is set to be approximately 228.82 mm. Further, a length T2 from a fore part 158 of the head 152 to a back of the head (occipital region) 160 is set to be approximately 197.67 mm.

Figure 7C:
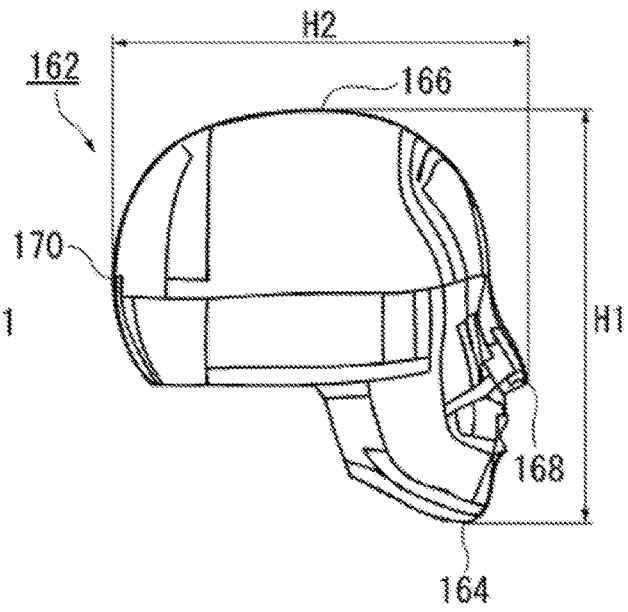
Figure 7B:
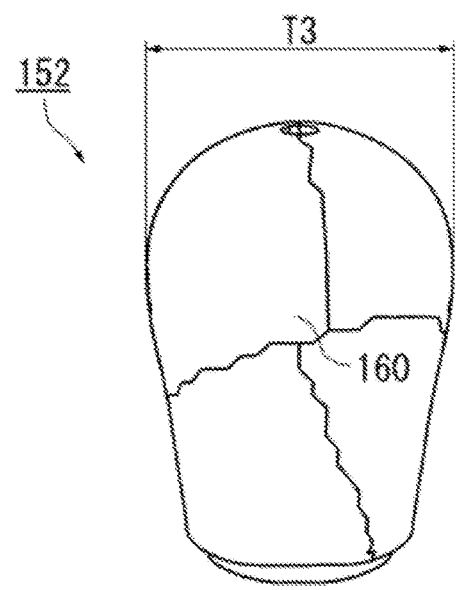

FIG. 7B is a diagram that exemplarily shows the head 144 of the Thor dummy shown in FIG. 7A when viewed from the side of the occipital region 160. A width T3 in the right and left direction (crosswise direction) of the head 152 of the Thor dummy is set to be approximately 157.78 mm.

FIG. 7C is a diagram that exemplarily shows a head 162 of the Hybrid3 dummy (hybrid three dummy) that is another kind of the human body dummies when viewed from the side. A height H1 from a jaw tip 164 to a parietal region 166 of the head 162 of the Hybrid3 dummy is set to be approximately 219.91 mm. Further, a length H2 from a nose 168 that is a front side of the head 162 to an occipital region 170 is set to be approximately 220.8 mm.

Figure 7D:
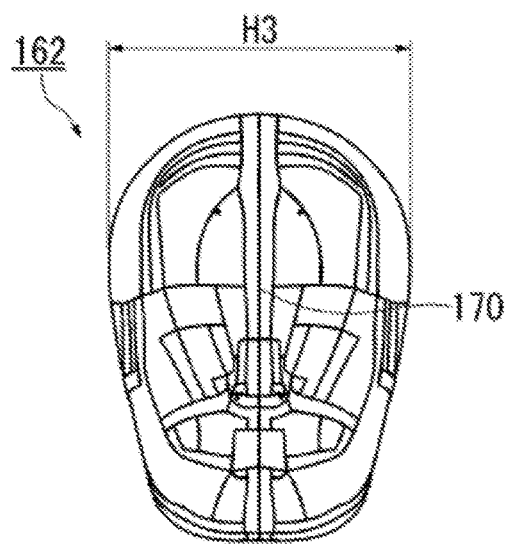

FIG. 7D is a diagram that exemplarily shows the head 162 of the Hybrid3 dummy shown in FIG. 7C when viewed from the side of the occipital region 170. A width H3 in the crosswise direction of the head 162 of the Hybrid3 dummy is set to be approximately 155.24 mm.

The distance D1 between the inner bag 120 and the curtain airbag cushion 112 shown in FIG. 2 can be set to be equal to or less than 155.24 mm with reference to the width H3 (approximately 155.24 mm) of the head 162 of the Hybrid3 dummy that is smaller so that both the width T3 (approximately 157.78 mm) of the head 152 of the Thor dummy shown in FIG. 7B and the width H3 (approximately 155.24 mm) of the head 162 of the Hybrid3 dummy shown in FIG. 7D can be restrained. Thus, by utilizing the inner bag 120 and the curtain airbag cushion 112, the head 144 of the occupant 126 can be suitably restrained.

As explained above, the width W1 of the head 144 of the occupant 126 is described in detail by utilizing each kind of dummies. Note, however, that the width W1 of the head 144 is different from individual to individual. Therefore, if the distance D1 between the inner bag 120 and the curtain airbag cushion 112 is set to be narrower than the width of the head of the specific dummy, the distance D1 is not necessarily narrower than the width of the head of every possible occupant. However, so long as a human being that has the head in which the width is larger than the distance D1 being set exists, the present embodiment has the effects in which the head 144 of the occupant 126 is suitably restrained. Thus, so long as the effects can be successfully achieved, any embodiment is not to be regarded as a departure from the technical scope of the present invention.

FIG. 8 is a diagram that exemplarily shows a process in which the frontal airbag cushion shown in FIG. 2 restrains an occupant in a front collision. Of course, the airbag device 100 according to the present embodiment can fully exhibit a restraint force in a regular collision not in the oblique collision.

As exemplarily shown in FIG. 8A, for instance, when the vehicle detects the front collision, the frontal airbag cushion 104 is expanded and deployed in front of the driver's seat 102. As exemplarily shown in FIG. 8B, when the front collision occurs, the occupant 126 enters ahead toward the frontal airbag cushion 104 by the inertia. Thereafter, as exemplarily shown in FIG. 8C, the occupant 126 is restrained by the frontal airbag cushion 104 from the front. At this time, although the frontal airbag cushion 104 has the double structure having the outer bag 118 and the inner bag 120, the occupant can be suitably restrained without any change as compared to the conventional frontal airbag cushion 104 having the single structure.

In other words with respect to the above-mentioned matter, while the frontal airbag cushion 104 restrains the occupant 126 in the same manner as the conventional frontal airbag cushion 104 such as in the regular front collision, it is possible to achieve the occupant restraint in which the injury value is suppressed than the conventional one in cooperation with the curtain airbag cushion 112 when the occupant 126 moves with an irregular behavior in the oblique collision.

Although the frontal airbag cushion 104 has the configuration in which the inner bag 120 is contained inside the outer bag 118, the appearance with respect to the shape and the size is the same as the conventional frontal airbag cushion having the single structure. Therefore, when a vehicle has the storage part 108 (refer to FIG. 1A) in which the conventional frontal airbag cushion can be stored, the frontal airbag cushion 104 can also be stored as it is without changing the configuration of the storage part 108 or the like. That is, the frontal airbag cushion 104 has high versatility. So long as a vehicle in which the conventional frontal airbag cushion can be used, it is achieved that the frontal airbag cushion 104 can secure the safer occupant restraint in the oblique collision while an installation cost is suppressed and the occupant restraint force is maintained in the same manner as the conventional configuration in the front collision.

Figure 9:
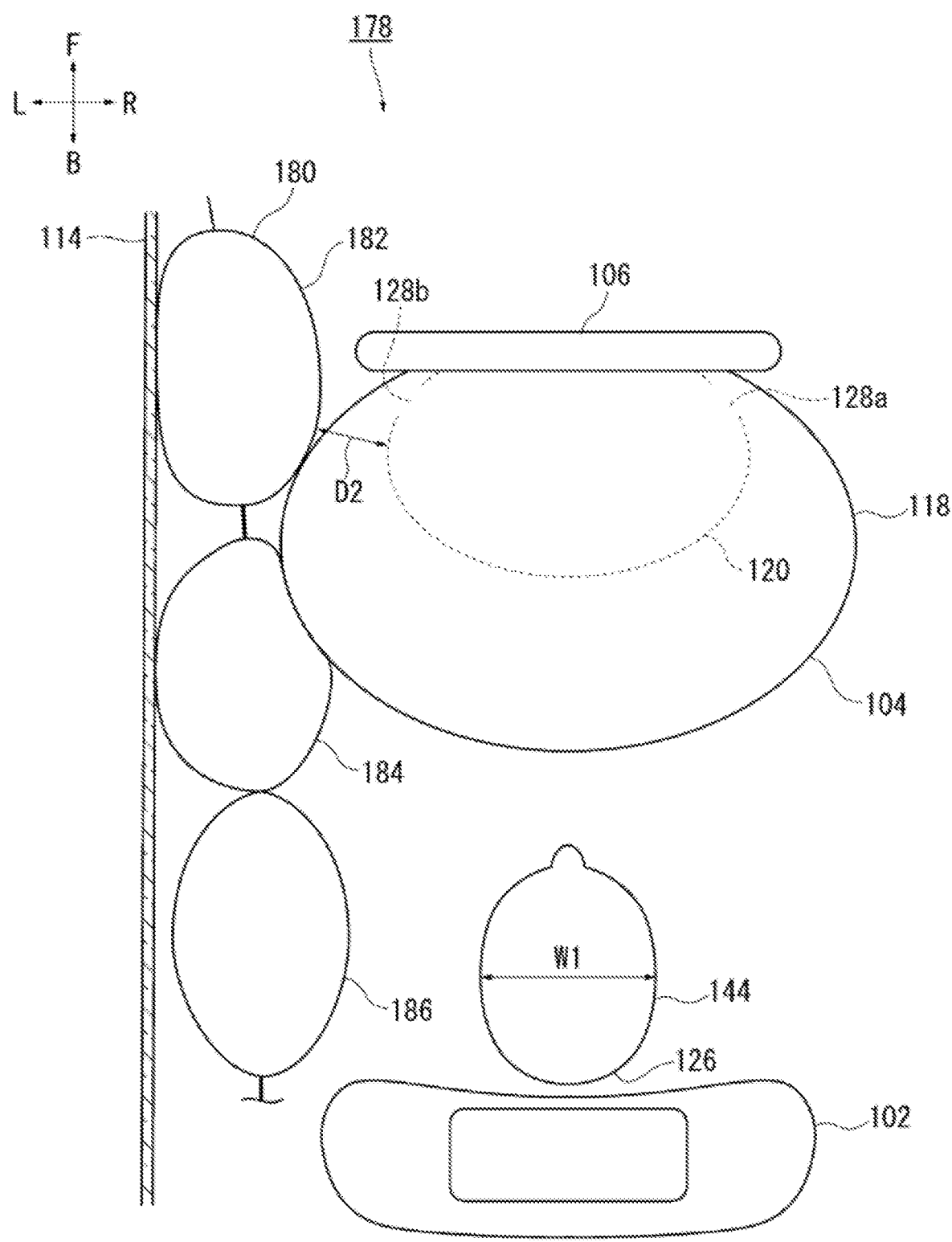
FIG. 9 is a diagram that exemplarily shows a variation of the airbag device shown in FIG. 2.

FIG. 9 is a diagram that exemplarily shows a variation of the airbag device 100 shown in FIG. 2. An airbag device 178 according to the variation has a curtain airbag cushion 180 that is divided into a plurality of chambers (in order from the vehicle front side, a first chamber 182, a second chamber 184, and a third chamber 186) in consideration of the positions in which the expansion region can be contacted by the occupant 126.

With respect to the airbag device 178, for instance, a distance D2 between the first chamber 182 that is located at the side of the frontal airbag cushion 104 and the inner bag 120 can be set to be narrower than the width W1 of the head 144 of the occupant 126. As explained above referring to FIG. 7, this distance D2 can be set to be equal to or less than 155.24 mm with reference to, for instance, the width H3 (approximately 155.24 mm) of the head 162 of the Hybrid3 dummy. Thus, the airbag device 178 can also suitably restrain the head 144 of the occupant 126 by utilizing the inner bag 120 and the curtain airbag cushion 180.

Although the preferred embodiments of the present invention have been described with reference to the attached drawings, the above-described embodiments are preferred examples of the present invention, and other embodiments can also be carried out in various ways. Unless there is a description that is considered to be a limitation in the specification, the present invention should not be limited to the detailed shape, size, configuration, and arrangement of parts shown in the attached drawings. Further, the expressions and terms used in the specification are for illustrative purposes, and unless there is a description that is considered to be a limitation, the same are not limited thereto.

Accordingly, it will be apparent to one of ordinary skill in the art to conceive various modifications within the scope of the claims. All such modifications are intended to be included within the technical scope of the present invention.

INDUSTRIAL APPLICABILITY OF THE INVENTION

The present invention can be utilized in an airbag device that restrains an occupant in an emergency.

What is claimed is:

1. An airbag device for restraining an occupant sitting on a vehicle seat, the airbag device comprising:
    a frontal airbag cushion expandable to a predetermined shape at a vehicle front side of the seat; and
    a curtain airbag cushion expandable to a position along a side window at an outer side of the frontal airbag cushion in a vehicle width direction,
    wherein the frontal airbag cushion includes:
        an inner bag expanded in a predetermined shape by receiving a gas;
        an inner vent disposed in the inner bag to exhaust the gas;
        an outer bag that contains the inner bag therein and is expandable in response to the gas from the inner vent; and
        an outer vent disposed in the outer bag to exhaust the gas, and
    a distance between the inner bag and the curtain airbag cushion is smaller than a width of a head of the occupant.

2. The airbag device according to claim 1, wherein the outer bag contacts the curtain airbag cushion when the outer bag is expanded.

3. The airbag device according to claim 1, wherein when the inner bag and the outer bag are expanded, an inner vent position of the inner vent and an outer vent position of the outer vent are different from each other in the vehicle width direction and in a vehicle vertical direction.

4. The airbag device according to claim 1, wherein the seat is a driver seat, and the frontal airbag cushion is provided at a center of a steering wheel, and
wherein the inner bag and the outer bag are expanded in a circular and three-dimensional shape when viewed from the driver seat.

5. The airbag device according to claim 4, wherein the inner vent is provided at a side of the steering wheel than a most expanded part of the inner bag in the vehicle width direction when the inner bag is expanded.

6. The airbag device according to claim 5, wherein the inner vent is provided at an inner side in the vehicle width direction with respect to the center of the steering wheel.

* * * * *